Figure 1:
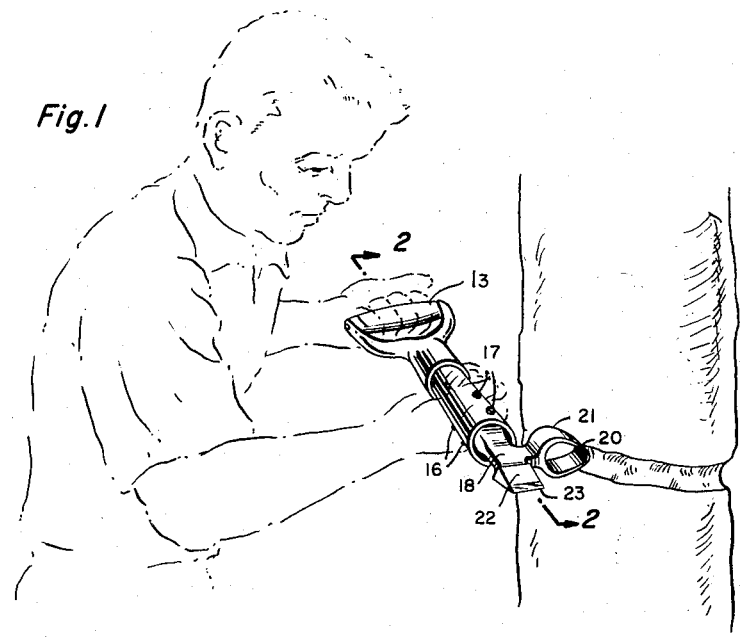

Jan. 27, 1959  A. F. GRISSETT  2,870,572
COMBINATION TREE GIRDLER AND PUNCH
Filed Nov. 9, 1955

INVENTOR
A. F. Grissett

BY

ATTORNEY

United States Patent Office 2,870,572
Patented Jan. 27, 1959

2,870,572

COMBINATION TREE GIRDLER AND PUNCH

Andrew F. Grissett, Hattiesburg, Miss.

Application November 9, 1955, Serial No. 545,973

6 Claims. (Cl. 47—1)

This invention relates to the care of trees and the like including the elimination of undesirable species, particularly those which hinder the management of commercial timber.

More particularly, the invention relates to a combination tool constructed to be used in cutting brush from around and limbs from trees, as well as for cutting girdles or encircling channels around undesirable trees for destroying them mechanically, and for making holes in trees for introduction of destructive substance for destroying them chemically.

It has been customary to use an axe or hatchet to cut limbs and brush from trees and to cut annular channels around the trunks or limbs of a tree to sever completely the outer and inner layers of bark and thereby interrupt the operation of the circulating system and the transfer of manufactured foods from the leaves to the root system of the tree with death by starvation the inevitable result.

The utilization of axes and hatchets in this manner have not been satisfactory because of the fact that they cannot be easily and effectively used in close places where there is insufficient room for swinging and they have provided substantial hazards in the holding and use of the same because of the fact that their blades are disposed at right angles to the handles. Also, they contain no provision for punching holes for the introduction of tree poisons.

It is an object of the invention to provide a compact hand tool of simple and inexpensive construction which can be used, in any space in which it can be inserted, for girdling or providing an annular horizontal channel around the entire circumference of the trunk or limb of a tree, and which also can be used for removing limbs and brush, and for cutting an opening in the tree for the introduction of poison.

Another object of the invention is to provide a weighted hand tool having a blade facing lengthwise of the handle instead of transversely or at right angles to the same.

Another object of the invention is to provide a combination tool having a D-type rear hand grip for protecting the hand of the operator on the back stroke and which hand grip is weighted internally on both sides for balance in operation and in which the portion of the tool gripped by the forehand is a straight section which may be a pipe made of metal, wood or other substance and of solid, tubular or other structure, extending from the rear grip and is weighted internally to provide the necessary inertia of motion to carry the cutting edge smoothly through its stroke.

A further object of the invention is to provide an elongated tool which is reciprocated along its axis when used with such axis weighted to provide additional force and with multiple cutting edges disposed transversely of its axis for performing cutting operations upon reciprocation of the tool.

Figure 2:
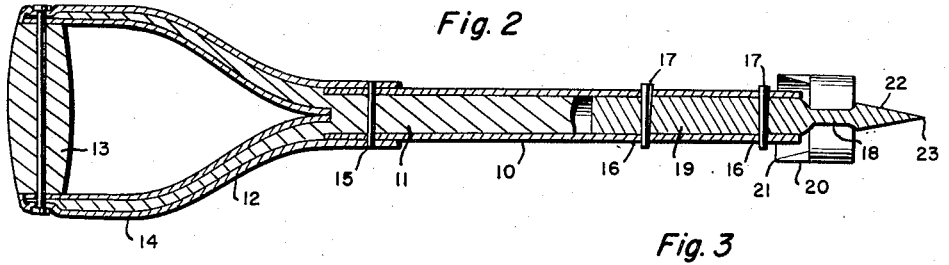
Figure 4:
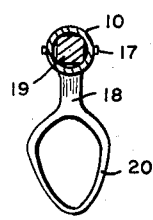
Figure 3:
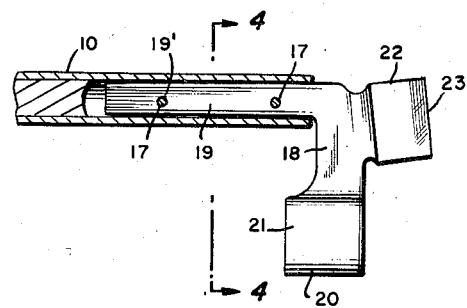

Other objects and advantages of the invention will be apparent from the following description taken in conjunction with the accompanying drawing wherein:

Fig. 1 is a perspective illustrating one application of the invention and the manner of its use;

Fig. 2, a longitudinal section through the device on the line 2—2 of Fig. 1;

Fig. 3, a longitudinal section through the cutter end of the device taken at right angles to the view of Fig. 2;

Fig. 4, a section on the line 4—4 of Fig. 3; and

Figure 5:
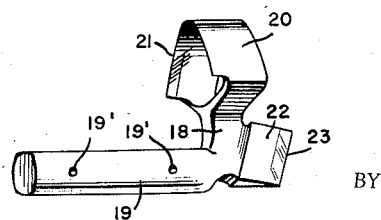

Fig. 5, a perspective of the cutter itself.

Briefly stated, the invention comprises a relatively straight body or handle with an internal weight and one end of which is telescoped and secured by a pin to a D-handle, the hand grip of which is protected by the spaced arms so that the hands of the operator will be protected during the operation of the tool. The other end of the tool is provided with a cutting edge which is substantially V-shaped and is located at right angles to the body of the tool and to the hand grip, with the wider end of the V-shaped cutting edge nearest to but slightly spaced from the body of the tool, such V-shaped cutting edge being carried on one end of an L-shaped support the opposite end of which extends into and is fastened by pins to the body of the tool. On the intermediate portion of the support in substantial alignment with the portion which projects into the handle the L-shaped member is provided with a relatively thick sturdy blade disposed with a relatively thin straight cutting edge centrally of the main body of the tool substantially at right angles thereto but at a slight angle from such right-angle position so that it may enter the tree when used for providing an opening for receiving tree poisoning substances. The angular blade is mounted on the shoulder of the cutting edge for use in punching holes in the tree for the introduction of various commercially available tree poisoning solutions.

With continued reference to the drawing, the invention comprises a relatively straight tubular body 10 with internal weight 11 added so that when the device is operated, because of the weight it will continue to travel in the same direction or have inertia in motion. On one end of the tubular body 10 is fastened a D-handle consisting of arms 12 and a hand grip 13, such D-handle including additional weight 14 in each arm thereof to supplement the weight 11 in the body. This weight is equally distributed internally of the handle on both sides for balance. The D-handle is telescoped over the tubular body and connected thereto by means of a pin 15, the handle and hand grip 13 protecting the operator's hand when the device is in use.

At its end remote from the handle the body is provided with transverse openings 16 in which are removable pins 17 for holding a removable cutter 18. This cutter has a substantially L-shaped body with one leg forming a shank 19 and having openings 19' aligned with openings 16 in the body 10 and adapted to receive the pins 17 for fastening the cutter in the body. The shank 19 is preferably of a size to substantially fill the hollow end of the body 10 to provide a solid connection therewith. The cutter is provided with oppositely disposed cutting edges including a V-shaped cutting portion 20 having cutting edges 21 disposed substantially at right angles to the body of the tool and to the handle and also to the hand grip, with the wider end of the V-shaped cutting edge adjacent to or slightly spaced from the body of the tool. The opposite facing cutting member 22 is mounted on the intermediate portion of the L-shaped supporting body and is substantially wedge-shaped and is provided with a relatively thick sturdy blade having a relatively thin straight cutting edge 23 substantially at right angles thereto but at a slight angle from such right angle position so that it may enter the tree when used for providing an opening for receiving tree poisoning substances. This angular blade is in alignment with the body of the device on the shoulder of the V-shaped cutting edge so that it is easy to operate to punch holes in the tree for receiving such commercially available tree poisoning solutions.

It will be understood from the foregoing that the present invention is a relatively simple structure including a body with a handle at one end and a cutter at the other end, which cutter includes oppositely faced cutting edges disposed substantially at right angles to the axis of the body so that movement of the body in an axial direction will produce cutting without requiring swinging movement of the tool and, also, due to the fact that the reversely disposed cutting edge is V-shaped, it can be readily employed for providing a channel around the body of a tree or a limb to interrupt the flow of sap and the transfer of food from the branches to the roots to cause the tree to die from starvation. Further, due to the arrangement of the parts, the cutting edge may easily be employed to cut through considerable depth of the wood beneath the surface and underlying layers including the possible secondary channels for the flow of the fluid of the circulating system and thereby assuring the results desired and the elimination of undesirable tree species which hinder the management of commercial timber.

It will be understood additionally that the tool replaces the axe and hatchet commercially used in cutting away limbs and brush in the actual girdling operation and is much safer due to the manner in which it is held and applied and also because the blade faces inwardly and rearwardly as opposed to facing at right angles to the axis of the body of the device.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A device of the character described comprising a relatively straight body having added weight to provide increased inertia of motion and driving force, a pair of arms attached to one end portion of said body and extending outwardly from the axis of said body and terminating in uniform relation, said arms being equally weighted internally to provide balance in operation, a hand grip mounted transversely between said spaced arms so that when said body is axially retracted the hands of the operator will be protected, a cutter disposed at the opposite end of said body from said hand grip, said cutter comprising a substantially L-shaped support adapted to be fastened to the end of said body opposite to said handle and with a hollow V-shaped cutting edge facing in the direction of said handle with the open end of said V-shaped cutting edge located adjacent to said body and the closed end of said cutting edge remote from said body, said cutter having an elongated cutting edge wedge-shaped in cross section, providing an extension of said body for cutting when the body is moved longitudinally with said cutting edge at its advanced end.

2. A device of the character described comprising a relatively straight body having added weight to provide increased inertia of motion and driving force, a pair of arms attached to one end portion of said body and extending outwardly from the axis of said body and terminating in uniform relation, said arms being equally weighted internally to provide balance in operation, a hand grip mounted transversely between said spaced arms so that when said body is axially retracted the hands of the operator will be protected, a cutter disposed at the opposite end of said body from said hand grip, said cutter comprising a substantially L-shaped support adapted to be fastened to the end of said body opposite to said handle and with a hollow V-shaped cutting edge facing in the direction of said handle with the open end of said V-shaped cutting edge located adjacent to said body and the closed end of said cutting edge remote from said body.

3. A tree girdler comprising a weighted elongated body and a removable cutter carried at the end thereof and having a pair of oppositely arranged cutting edges disposed transversely of said body one at the end of said body and one adjacent to the end of said body at one side of the same, and of a configuration to cut a channel in the trunk of a tree when said body is moved longitudinally with said cutter along the surface of the tree.

4. A combination tool comprising a relatively short straight stocky body having a transversely disposed D-handle at one end internally weighted for balance when the tool is gripped and moved endwise in either direction with substantial force, cutting means removably carried by and relatively close to the axis of said tool adjacent the end opposite said D-handle, said cutting means comprising a substantially L-shaped member having a hollow cutting portion disposed substantially at right angles to the axis of the tool and with the cutting edge facing toward said D-handle whereby said tool may be forcibly moved axially for cutting a groove in the trunk of a tree.

5. A tree girdler comprising a body and cutting blade for application upon the end of said body, said blade having a cutting edge across the end of said body and a lateral projection and a V-shaped cutting edge disposed thereon lengthwise of the axis of said body and with the juncture portion of the V disposed outwardly from and the leg portions of the V disposed toward said body.

6. A tree girdler comprising a body and cutting blade for application upon the end of said body, said blade having a lateral projection and a V-shaped cutting edge disposed thereon lengthwise of the axis of said body with the juncture portion of the V disposed outwardly from and the leg portions of the V disposed toward said body, and with a cutting edge facing lengthwise of the body in a direction opposite that of said V-shaped cutting edge and transverse to the body at an angle slightly different from that of a right angle.

References Cited in the file of this patent

UNITED STATES PATENTS

| 57,542 | Michaels | Aug. 28, 1866 |
| 579,287 | Wylly | Mar. 23, 1897 |
| 1,304,647 | Basta | May 27, 1919 |
| 1,818,906 | McKoy | Aug. 11, 1931 |
| 2,010,636 | Koonce | Aug. 6, 1935 |
| 2,254,021 | Sessoms | Aug. 26, 1941 |
| 2,699,189 | McLeod | Jan. 11, 1955 |

FOREIGN PATENTS

| 163,359 | Austria | June 25, 1949 |
| 173,897 | Austria | Feb. 10, 1953 |
| 14,146 | Great Britain | of 1906 |
| 19,296 | Great Britain | of 1910 |